United States Patent [19]
Bacha et al.

[11] 3,742,073
[45] June 26, 1973

[54] CONVERSION OF CHLOROAROMATICS TO META DERIVATIVES BEYOND EQUILIBRIUM

[75] Inventors: John D. Bacha, Monroeville; Charles M. Selwitz, Pitcairn, both of Pa.

[73] Assignee: Gulf Research & Development Company, Pittsburgh, Pa.

[22] Filed: Dec. 3, 1969

[21] Appl. No.: 881,850

[52] U.S. Cl. ............................................. 260/650 R
[51] Int. Cl. ........................................... C07c 25/04
[58] Field of Search ..................................... 260/650

[56] References Cited
UNITED STATES PATENTS

| | | | |
|---|---|---|---|
| 3,560,579 | 2/1971 | Bacha et al. | 260/650 R |
| 3,577,470 | 5/1971 | Bacha et al. | 260/650 R |
| 2,881,224 | 4/1959 | McCaulay et al. | 260/650 R |
| 2,819,321 | 1/1958 | Pray | 260/650 R |
| 2,727,075 | 12/1955 | Mattana | 260/650 R |
| 2,564,073 | 8/1951 | Lien et al. | 260/668 A X |
| 2,766,305 | 10/1956 | McCaulay et al. | 260/668 A |
| 2,589,621 | 3/1952 | Lien et al. | 260/668 A |

*Primary Examiner*—Howard T. Mars
*Attorney*—Meyer Neishloss, Deane E. Keith and J. J. Carducci

[57] ABSTRACT

The meta chloroaromatic content of the chloroalkylbenzenes prepared by a $HF-BF_3$ catalyzed isomerization process may be increased beyond the expected equilibrium by terminating the isomerization before equilibrium is attained, separating the resulting organic and HF layers and subjecting the HF layer to a temperature of from about 40' to 160°C. The process is particularly well suited to the formation of greater than equilibrium amounts of 1,3,5-chloroxylene and meta-chlorotoluene from isomeric mixtures of chloroxylenes and chlorotoluenes, respectively.

2 Claims, No Drawings

CONVERSION OF CHLOROAROMATICS TO META DERIVATIVES BEYOND EQUILIBRIUM

This invention relates to a method of increasing the content of meta orientated haloalkylbenzenes in a mixture of haloalkylbenzene isomers and, more particularly, to a method of increasing the content of chloromethylbenzenes such as 1,3,5-chloroxylene and meta-chlorotoluene.

Chloroxylenes can exist in six isomeric forms, but of these the meta isomer, i.e., 1,3,5-chloroxylene,

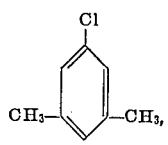

has an appreciable commercial attraction. For example, as shown in U.S. Pat. No. 3,352,927 to De Vries et al., 3,5-xylenol can be used in the preparation of a readily curable formaldehyde-type thermosetting polymer. The 3,5-xylenol required for such polymer can easily be obtained by a conventional hydrolysis of 1,3,5-chloroxylene.

Likewise, chlorotoluenes can exist in three isomeric forms and, as is the case with chloroxylenes, the meta form offers appreciable commercial attraction. In this connection, meta-chlorotoluene is readily hydrolyzed to meta-cresol which, in turn, readily reacts with formaldehyde to form phenolic resins. Whereas the ortho- or para- methyl groups in phenolic aromatics hinder the condensation with formaldehyde and also block attack at the ortho- and para- positions, meta-cresol does not give rise to these problems. Moreover, meta-cresol condenses with formaldehyde at a rate which is three times as fast as the condensation between formaldehyde and phenol itself.

As disclosed in our copending application, Ser. No. 785,793, filed Dec. 20, 1968 now U.S. Pat. No. 3,560,579, meta-chlorotoluene can be prepared by the isomerization of o-chlorotoluene of p-chlorotoluene, either singly or in combination, by the mere expedient of contacting the chlorotoluene charge with HF, BF$_3$ and chlorobenzene. The molar ratio of HF to BF$_3$ used in the isomerization reaction can be from about 1:1 to about 100:1, preferably from about 2:1 to about 10:1. The molar ratio of HF and BF$_3$ (as a combined entity) to the chlorotoluene charge can be from about 1:1 to about 100:1, preferably from about 5:1 to about 50:1. The molar ratio of chlorobenzene to chlorotoluene charge can be from about 0.2:1 to about 4:1, preferably from about 0.5:1 to about 2:1.

We have also disclosed in our copending application, Ser. No. 785,798, filed Dec. 20, 1968 now U.S. Pat. No. 3,577,470, that 1,3,5-chloroxylene can be produced by a similar HF-BF$_3$ catalyzed isomerization process wherein a chloroxylene charge (which can include any chloroxylene isomer other than 1,3,5-chloroxylene or any combination of chloroxylene isomers relatively poor in 1,3,5chloroxylene, either singly or in the presence of added chlorotoluenes) is contacted with the HF and BF$_3$. The molar ratio of HF to BF$_3$ used in the isomerization reaction can be from about 100:1 to about 1:1, preferably from about 10:1 to about 2:1. The molar ratio of HF and BF$_3$ (as a combined entity) to the haloxylene charge can be from about 300:1 to about 1:1, preferably in the range of about 50:1 to about 5:1.

In both of the aforesaid isomerization processes, it was found that the amount of the meta orientated isomers in the product asymptotically approached an equilibrium limit. Accordingly, much more time was consumed in preparing the last few per-cent of the respective meta isomers than the initial portions thereof.

We have now discovered a technique which enables a vast improvement in the amount of 1,3,5-chloroxylene and/or meta-toluene which can be produced, and which effectively avoids the undesirably long period heretofore necessary to attain equilibrium. According to our present discovery, the isomerization reaction disclosed in either of our aforesaid copending applications is terminated somewhat prior to the attainment of equilibrium. At this point, the reaction vessel contains three separate phases, i.e., a gaseous phase consisting almost entirely of BF$_3$, a first liquid phase comprising a mixture of chloroalkylbenzenes and disproportionation products, and an HF layer which is rich in complexed meta-chlorotoluene and/or 1,3,5-chloroxylene. The meta isomer-rich HF layer is then separated from the organic layer and is briefly subjected to an elevated temperature of from about 40° to 160°C. The heat treatment of the HF layer in the absence of any contacting organic phase causes a relatively rapid increase in the content of the respective meta isomer in the HF layer beyond the expected equilibrium, and thereby effectively obviates the undesirably slow attainment of equilibrium inherent in a simple HF-BF$_3$ catalyzed chloroalkylbenzene isomerization. In other words, the present invention involves the isomerization of an already meta rich isomeric mixture into an even more highly meta rich mixture, the isomerization taking place while the isomeric mixture is totally dissolved in an HF layer, i.e., in the absence of a contacting organic phase.

The isomerization technique defined herein can be illustrated by the following. An isomeric mixture of chloroxylenes poor in 1,3,5-chloroxylene and a small amount of chlorotoluene were placed in a 300 ml. stainless steel autoclave equipped with a stirrer, an internal cooling coil and an external heating mantle. After cooling to less than 0°C., anhydrous HF was condensed into the reactor and BF$_3$ was pressured in, the amounts charged being determined by the weight losses of the lecture bottles from which each material was taken.

The contents of the reactor were heated and stirred during the course of the reaction, with the temperature being as low as about 25°C. or as high as about 160°C., but preferably remaining in the range of about 100° to about 140°C. Below about 25°C. the reaction rate is too slow, whereas at temperatures in excess of about 160°C. dehalogenation and the formation of decomposition products and polymers is facilitated. Pressure is not critical and can be as low as about 15 pounds per square inch gauge. In effect any pressure sufficient to maintain the HF in the liquid phase can be employed. The reaction time is highly dependent upon the other factors discussed herein and can therefore be varied over a wide range, although in general a time of about 10 minutes to about 5 hours, preferably about 30 minutes to about 3 hours can be used. It will be appreciated that a reaction time in excess of this range is unwarranted since the formation of 1,3,5-chloroxylene slows down considerably and begins to asymptotically approach an equilibrium amount of about 23 percent.

Thus, before the reaction reached equilibrium, the stirring was discontinued to permit the stratification of an organic phase, an HF phase and a gaseous $BF_3$ phase within the reactor. The HF phase, which was rich in complexed 1,3,5-chloroxylene, was separated from the contacting organic phase and heated to a temperature of from about 40° to 160°C., and preferably from about 65° to about 95°C., for a period of from about 0.1 to about 60 minutes, and preferred heating period ranging from about 10 to 40 minutes. The pressure that developed within the slated reactor at the indicated temperature was recorded. The reactor was then cooled to less than 0°C. and the product was withdrawn via a bottom drain onto cracked ice in a polyethylene vessel. The resulting 1,3,5-chloroxylene rich aqueous HF mixture was extracted at least twice with aliquots of a light hydrocarbon, such as hexane. The extracts were then combined and washed free of acid first with water, then with a solution of 2 percent aqueous sodium bicarbonate and then again with water. The washed hydrocarbon solution was finally dried over sodium sulfate, whereupon the chloroaromatic products were analyzed by gas chromatography employing an 80 foot × ⅛ inch stainless steel column packed with 15 percent p-azoxyanisole on acid washed 30/60 mesh chromosorb W, and a 10 foot × ⅛ inch stainless steel column packed with 20 percent FFAP on acid washed, DMCS treated, 70/80 mesh chromosorb W, both operated at 120°C. The results obtained are tabulated below in TABLE 1.

In another illustration of the present invention, an isomeric mixture of chlorotoluenes poor in meta-chlorotoluene and chlorobenzene were placed in a reactor along with HF and $BF_3$, heated to a temperature between about 40° and 160°C., preferably from about 100° to about 140°C., removed and worked up via the same techniques described above. Gas chromatographic analysis of the resulting hydrocarbon solution of the chloroaromatic products was conducted on the same columns noted above. The results of the analysis are tabulated below in TABLE 2.

TABLE 2
CHLOROTOLUENE ISOMERIZATION

| Run No. | Layer or Product | Chloroaromatic Distribution Between Layers | | Chlorotoluene Isomer Distribution | | |
|---|---|---|---|---|---|---|
| | | CB | CT | ortho | meta | para |
| 15 | Charge | — | — | 51.9 | 35.1 | 13.0 |
| | Extract | 16.4 | 12.8 | 47.0 | 38.7 | 14.3 |
| | Raffinate | 83.6 | 87.2 | 52.6 | 34.5 | 12.9 |
| 16 | Charge | — | — | 50.2 | 35.3 | 14.5 |
| | Product | — | — | 37.4 | 45.1 | 15.5 |

In practice, the amount of meta orientated isomers appearing in the final product is related to the content thereof within the separated liquid HF phase. This, in turn, is related to the stability of the particular meta orientated chloroaromatic·HF·$BF_3$ complexes involved and to the relative amounts of uncomplexed isomers entrained in the liquid HF phase. In this connection, the data in the above tables clearly illustrates the content of meta orientated material contained in the separated liquid HF phase. For example, Run Nos. 11 and 12 provide initial data which illustrate the "solubility" of the chloroxylenes in HF, or more exactly, the capacity of the HF layer for the 1,3,5-chloroxylene and other chloroxylene complexes. Thus, by referring to Run Nos. 11 and 12, one can estimate the proportions of HF and $BF_3$ that are necessary to totally "dissolve" chloroxylenes of various compositions. Likewise, Run No. 15 demonstrates the solubility of chlorobenzene and chlorotoluene in the liquid HF phase in the presence of $BF_3$.

With reference to Run No. 12, it should be noted that because of a more selective complex formation, the 1,3,5-chloroxylene content of the chloroxylene within the HF phase is much greater than the normally expected equilibrium value of about 23 percent even though the entire system contains less than the equilibrium amount of 1,3,5-chloroxylene. Moreover, it should be noted that isomerization of the material within the HF layer carries the 1,3,5-chloroxylene content from somewhere beyond the equilibrium amount toward 100 percent 1,3,5-chloroxylene. This phenomenon is particularly well illustrated in Run No. 14 wherein a solution of chloroxylenes with a 1,3,5-chloroxylene content of 79.5 percent was heated to 80°C. Not only did isomerization occur, but the content of 1,3,5-chloroxylene, rather than proceeding to the equilibrium value of about 23 percent, actually increased to 92.5 percent. While an increase in the amount of meta-chlorotoluene in the final isomer distribution may also be obtained in accordance with the

TABLE 1.—CHLOROXYLENE ISOMERIZATION

| Run No. | Charge, mols. | | | Molar ratios | | Temp., °C. | Pressure, p.s.i.g.[1] | Time, min.[2] | Charge layer or product | Chloroaromatic distribution between layers | | Chloroxylene isomer distribution | | | | | |
|---|---|---|---|---|---|---|---|---|---|---|---|---|---|---|---|---|---|
| | CX CT | HF $BF_3$ | Hexane | CT/CX | HF/CX $BF_3$/CX | | | | | CT | CX | 1,2,6- | 1,2,5- | 1,2,4- | 1,3,5- | 1,2,3- | 1,3,4- |
| 11 | {0.0678 0} | {1.65 0.274} | 0.15 | 0 | {24.3 4.04} | 21 | 155 | | Charge | — | — | 2.8 | 9.6 | 6.0 | 78.9 | 1.6 | 1.1 |
| | | | | | | | | | Extract | 39.8 | — | 0.4 | 1.6 | 0.7 | 96.1 | 0.9 | 0.3 |
| | | | | | | | | | Raffinate | 60.2 | — | 4.5 | 14.8 | 8.8 | 66.5 | 3.2 | 2.2 |
| 12 | {0.0855 0.343} | {2.79 0.525} | 0 | 4.02 | {32.6 6.14} | 80 | 560 | | Charge | — | — | 11.3 | 27.7 | 24.9 | 26.2 | 4.9 | 5.0 |
| | | | | | | | | | Extract | 4.7 | 21.3 | 1.4 | 4.7 | 2.7 | 89.4 | 0.9 | 0.9 |
| | | | | | | | | | Raffinate | 95.3 | 78.7 | 14.0 | 33.9 | 30.9 | 9.1 | 6.0 | 6.1 |
| 13 | {0.0419 0.0068} | {3.19 0.124} | 0 | 0.16 | {76.1 2.96} | 80 | 150 | 30 | Charge | — | — | 4.3 | 14.8 | 7.4 | 68.9 | 2.9 | 1.7 |
| | | | | | | | | | Product | — | — | 3.7 | 9.8 | 9.4 | 72.3 | 1.8 | 3.2 |
| 14 | {0.0420 0.0016} | {3.07 0.510} | 0 | 0.038 | {73.0 12.1} | 80 | 520 | 15 | Charge | — | — | 2.7 | 9.5 | 5.4 | 79.5 | 1.9 | 1.0 |
| | | | | | | | | | Product | — | — | 0.7 | 3.4 | 2.3 | 92.5 | 0.4 | 0.7 |

[1] Pressure reached at indicated temperature.
[2] Residence time at indicated temperature.

NOTE.—CX=chloroxylene; CT=chlorotoluene.

TABLE 2.—CHLOROTOLUENE ISOMERIZATION

| Run No. | Charge, mols | | Molar ratios | | Temp., °C. | Pressure, p.s.i.g.[1] | Time, min.[2] |
|---|---|---|---|---|---|---|---|
| | CT CB | HF $BF_3$ | CB/CT | HF/CT $BF_3$/CT | | | |
| 15 | {0.158 0.160} | {1.79 0.347} | 1.01 | {11.3 2.20} | 105 | 550 | |
| 16 | {0.027 0.014} | {3.20 0.388} | 0.52 | {118.0 14.4} | 118 | 600 | 15 |

[1] Pressure reached at indicated temperature.
[2] Residence time at indicated temperature.

NOTE.—CT=chlorotoluene; CB=chlorobenzene.

present invention, the results are not so dramatic as in the case of 1,3,5-chloroxylene. This is due to a less selective complex formation (compare Run No. 15 with Run Nos. 11 and 12) and other considerations mentioned above. Accordingly, the meta-chlorotoluene content of the chlorotoluene within or without the HF phase is apparently never much greater than the equilibrium amount of about 43 percent. However, by contacting a chlorotoluene mixture whose meta-chlorotoluene content is less than about 43 percent with a high proportion of HF and $BF_3$ at 118°C., the meta-chlorotoluene content is driven slightly beyond the equilibrium amount in a relatively short time (Run No. 16).

It is to be understood that the above-described embodiments are simply illustrated of the principles of the present invention. Thus, although the invention has been described in connection with the use of a HF-$BF_3$ catalyst, it is to be understood that other Lewis acid catalysts, e.g., $AlCl_3$-HCl, could be employed. Various other modifications and changes ma be devised by those skilled in the art which will embody the principles of the invention and fall within the spirit and scope thereof.

We claim:

1. In the process wherein a chloroxylene charge, other than 1,3,5-chloroxylene, is isomerized to 1,3,5-chloroxylene, by contacting such charge with anhydrous HF and $BF_3$, wherein the molar ratio of HF to $BF_3$ is from about 100:1 to about 1:1 and the molar ratio of HF and $BF_3$, as a combined entity, to the chloroxylene charge is from about 300:1 to about 1:1, resulting in a gaseous phase consisting essentially of $BF_3$, a liquid layer comprising a mixture of chloroxylenes and a liquid HF layer rich in 1,3,5-chloroxylene and containing chloroxylenes other than 1,3,5-chlorozylene, the improvement which comprises recovering said HF layer and subjecting the same to a temperature of about 40° to 160° C. for about 0.1 to about 60 minutes in a sealed reactor to increase the 1,3,5-chloroxylene content of said HF layer.

2. The process of claim 1 wherein the recovered HF layer is subjected to a temperature of about 65° to about 95° C. for about 10 to 40 minutes.

* * * * *